United States Patent [19]

Schulze

[11] 4,304,093
[45] Dec. 8, 1981

[54] VARIABLE CLEARANCE CONTROL FOR A GAS TURBINE ENGINE

[75] Inventor: Wallace M. Schulze, West Chester, Ohio

[73] Assignee: General Electric Company, Cincinnati, Ohio

[21] Appl. No.: 71,502

[22] Filed: Aug. 31, 1979

[51] Int. Cl.³ .......................... F02C 6/14; F02K 3/06
[52] U.S. Cl. ................... 60/39.07; 60/226 R; 60/39.29; 60/39.75; 60/39.09 R
[58] Field of Search .............. 60/39.07, 226 R, 39.29, 60/39.75, 39.09 R; 415/116, 134-138

[56] References Cited

U.S. PATENT DOCUMENTS

| | | | |
|---|---|---|---|
| 2,845,776 | 8/1958 | Traupel | 60/39.07 |
| 3,060,680 | 10/1962 | Wilde et al. | 60/39.29 |
| 3,060,686 | 10/1962 | Le May et al. | 60/39.07 |
| 3,108,434 | 10/1963 | Morley et al. | 60/39.07 |
| 3,365,172 | 1/1968 | McDonough | 60/39.75 |
| 3,659,417 | 5/1972 | Grieb | 60/39.07 |
| 4,019,320 | 4/1977 | Redinger et al. | 415/116 |
| 4,023,919 | 5/1977 | Patterson | 415/134 |
| 4,069,662 | 1/1978 | Redinger et al. | 60/39.75 |
| 4,101,242 | 7/1978 | Coplin et al. | 415/134 |

FOREIGN PATENT DOCUMENTS

| | | |
|---|---|---|
| 1248198 | 4/1971 | United Kingdom . |
| 1491112 | 11/1977 | United Kingdom . |
| 2025536 | 1/1980 | United Kingdom . |

Primary Examiner—Robert E. Garrett
Attorney, Agent, or Firm—Donald W. Walk; Carl L. Silverman; Derek P. Lawrence

[57] ABSTRACT

Clearance control between an outer air seal of a gas turbine engine and an internal, turbine section of the engine is controlled by selectively modulating a cooling air supply that is directed to selected portions of the air seal supporting structure to control its thermal growth. Impingement of the cooling air causes contraction of the seal structure, thereby lessening the clearance for the purpose of improving engine performance. The flow of cooling air is modulated in response to engine speed and engine altitude to maintain relatively low clearance during critical periods of engine operation.

6 Claims, 3 Drawing Figures

VARIABLE CLEARANCE CONTROL FOR A GAS TURBINE ENGINE

BACKGROUND OF THE INVENTION

1. Field of the Invention

This invention relates to gas turbine engines and, more particularly, to clearance control between rotating machinery and an outer shroud or seal.

2. Summary of the Prior Art

In the quest for improving the performance of current generation gas turbine engines, a great deal of development has been directed at harnessing the full potential of combustion gases by reducing the leakage of hot gas turbine air. One of these leakage areas is between tips of rotating turbine blades and an outer shroud or seal of the turbine compartment causing a substantial loss of turbine efficiency and an increase in fuel consumption. This leakage can be reduced if the engine is provided with a controlled means of cooling the turbine case which encloses and supports the outer shroud or seal. The cooling of this case by either internal or external means causes a thermal contraction around the tips of the rotating turbine blades and reduces blade tip clearance. This procedure is commonly known to those skilled in the art as clearance control and is currently being introduced into advanced aircraft engines to improve engine performance.

While the clearance control system for directing cooling airflow to the turbine case improves gas turbine performance, even greater benefits can be obtained by varying or modulating this flow of cooling air, thereby varying the clearance control. Because the engine operates at different speeds and temperatures, the clearance between turbine blades and the outer shroud or seal on engines without clearance control varies with the rotational speed of the blades and the gas temperatures within the engine. To maximize the performance of the engine, it is desirable to maintain the clearance between the blades and the shroud at a minimum value during various engine operations. By modulating the amount of cooling air directed onto the engine case, and matching the amount of cooling air with the present engine operation, lesser clearances can be obtained.

A further improvement in engine operation can be achieved by selective allocation of cooling airflow between the clearance control and other equipment or airspace within the engine system that can benefit from cooler temperatures.

SUMMARY OF THE INVENTION

It is, therefore, an object of the present invention to provide a gas turbine engine with an improved means of varying the volume of an external cooling airflow that impinges upon a turbine case to control clearance between rotating turbine machinery and an outer circumferential shroud.

Another object of the present invention is to match the amount of cooling airflow directed through the clearance control with engine operation characteristics in order to maintain relatively low clearance during a variety of engine operations.

A further object of the present invention is to utilize available cooling airflow to ventilate engine compartment airspace when the flow of cooling air to the clearance control is decreased.

Briefly, in the apparatus form of the present invention, a gas turbine engine is provided with a means for directing cooling air to a clearance control at the turbine case to control clearance between the case and rotating turbine machinery inside the case. The cooling air is supplied from a compressor section through a case cooling line. The case cooling line is provided with a cutoff to a bypass line for redirecting varying portions of the cooling airflow to other regions within the engine compartment that can benefit from cooling airflow. The function of varying clearance control is accomplished by varying this redirection of cooling air through the bypass line.

In one embodiment of the present invention, both the case cooling line and the bypass line are provided with valves for controlling the flow of cooling air; and, in another embodiment, only the bypass line is provided with such a valve. In an application of this invention to an aircraft engine, the valve provided in the bypass line is responsive to a barometric device for the purpose of closing the valve during upper altitude operations including aircraft cruise to cause all or most of the cooling air to flow through the case cooling line to the clearance control for decreasing clearance. At lower altitudes, the bypass line valve is opened to divert a substantial portion of cooling air through the bypass line into engine compartment airspace for cooling and ventilating various engine components. The bypass line valve opening can be modulated to extract varying amounts of cooling airflow to further modulate flow to the clearance control. The valve in the case cooling line is responsive to an engine parameter such as speed and is closed to reduce case cooling airflow to a low value or to a no-flow condition when the engine is at or near idle speed because speed transients from this operating condition can then be made in a shorter time without incurring rubs between the rotating turbine machinery and the turbine case.

In the method form of the present invention, variation of clearance control is provided by redirecting a portion of cooling airflow from the clearance control line to other regions of the engine compartment that require cooling air. This redirection of cooling air is accomplished during appropriate periods of engine operation when it is not desirable to decrease the clearance, such as during engine idle or during deceleration.

DESCRIPTION OF THE DRAWINGS

While the specification concludes with the claims distinctly claiming and particularly pointing out the invention described herein, it is believed that the invention will be more clearly understood by reference to the discussion below in conjunction with the following drawings:

DESCRIPTION OF THE PREFERRED EMBODIMENT

Figure 1:
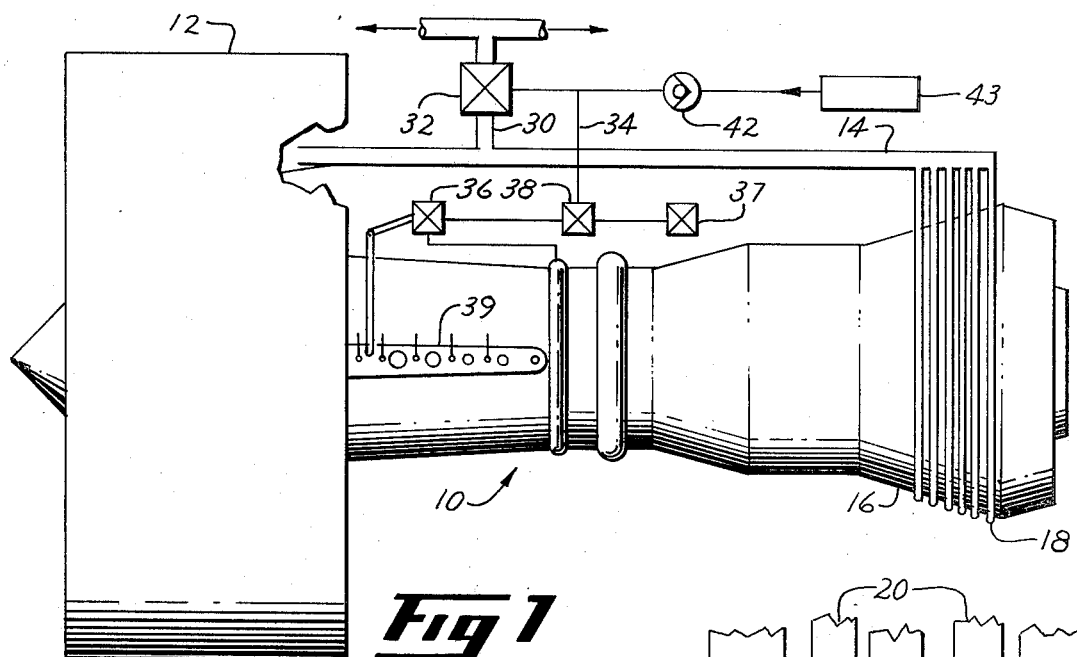
FIG. 1 is a schematic view of one embodiment of the invention mounted on a gas turbofan aircraft engine.

Referring now to FIG. 1, one embodiment of the present invention is shown on a gas turbofan aircraft engine 10 wherein a source of cooling air is derived from bypass air coming from a fan 12 located at a forward section of the engine 10. The fan 12 provides a convenient source of sufficiently compressed air that is relatively cool and quite appropriate for cooling of a turbine case downstream of the fan. In an application of the invention on other than a turbofan aircraft engine, the cooling air can be derived from a compressor section of the engine, preferably from a forward stage of the compressor.

Clearance Control

This compressed cooling air is directed through a case cooling line 14 to a clearance control 15 in a section of the engine which employs cooling airflow for the purpose of controlling clearance. In the embodiment of the invention shown in FIG. 1, the cooled section of the engine is a turbine case 16 that is cooled for the purpose of changing clearance between rotating turbine blades and a surrounding turbine shroud within the case. The cooling air is directed around the turbine case 16 with a series of tubes 18 which encircle the turbine case.

Figure 2:
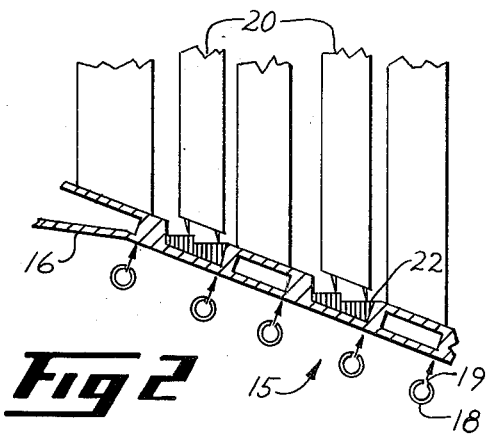
FIG. 2 is an enlarged cross-sectional, fragmented view of a portion of a clearance control of the type shown in FIG. 1.

Referring now to FIG. 2, a cross section of a portion of the clearance control 15, the turbine case 16 and the surrounding tubes 18 is shown. To cool the turbine case 16 for the purpose of decreasing clearance, cooling air is directed through holes 19 in the tubes 18 to impinge cooling air upon the circumference of the case 16 causing the case and the turbine shroud 22 to contract and decrease the clearance.

Reduction of clearance with this technique is useful for a broad range of engine speeds. Inside the turbine case 16, hot turbine gases flow downstream causing the turbine blades 20 to rotate at high velocities. Rotation induces elastic radial growth in the blades 20. In addition, the high temperature of the turbine gases causes the blades 20 to expand thermally. When engine speed is increased, the combined effect of elastic radial growth and thermal expansion causes the ends of the blades 20 to expand radially outward reducing clearance from that portion of the case 16 surrounding the blades, commonly referred to as the turbine shroud 22. However, sustained engine operation at speed will cause the temperature of turbine case 16 to increase, causing case radial expansion that increases clearance between the blades 20 and the shroud 22.

A general goal is to minimize clearance between the tips of the turbine blades 20 and the turbine shroud 22; but this must be done in a manner that prevents rubs, which depend on mode of engine operation. There are three basic modes of engine operation requiring three basic rates of cooling airflow through the tubes 18 of the clearance control 15.

First, the engine is operated at idle, or relatively low speeds when there is little or no importance placed on harnessing the full potential of the turbine gases flowing across the turbine blades 20. In this mode there is relatively little emphasis placed on reducing clearance between the tips of the turbine blades 20 and the shroud 22. Therefore, little or no cooling air is desirable in the clearance control 15 to reduce clearance.

Second, the engine is operated in a full throttle mode to obtain maximum engine power. At full throttle, a low level of clearance between the blades 20 and the shroud 22 is desirable to obtain high performance and thrust from the engine. However, during the speed transient to full throttle operation, the turbine case 16, which is somewhat insulated from the hot turbine gases, is still relatively cool and hasn't fully expanded. Thus, it is desirable to deliver a nominal or modulated flow of cooling airflow to the clearance control 15 for the purpose of decreasing clearance without causing blade-tip rubs.

The third mode is when the engine is operated at higher than idle speed under steady-state or relatively stable conditions, such as during aircraft cruise, and the turbine case 16 has been fully heated and has fully expanded radially causing relatively large clearance. During the mode of operation the most beneficial condition is to provide a higher level of cooling air at the turbine case 16 to cool the case and the shroud 22, thereby causing substantial contraction of the turbine shroud to decrease the clearance between the blades and the shroud. This higher case cooling will minimize the escape around the ends of the blades 20 of hot gases that are not transferring motive force to the blades. This clearance reduction forces essentially all of the gases to transfer their motive force to the turbine, thereby improving the efficiency of the engine.

The purpose of the present invention is to vary or modulate the flow of case cooling air to match the contraction of the turbine case 16 with radial expansion and contraction of turbine blades 20 to maintain low clearance between the blades and the shroud during a broad range of engine operations.

First Embodiment

Referring again to FIG. 1, a bypass line 30 is directly connected to the case cooling line 14 at a position between the source of cooling air and the cooling tubes 18. This bypass line 30 is provided for the purpose of diverting a portion of the cooling air flowing from the case cooling line 14 and directing that diverted portion of cooling air onto other engine components or in airspace in the engine compartment requiring cooling air. The bypass line 30 is a desirable means of diminishing the flow of cooling air to the turbine case 16 because that portion of cooling air can be employed usefully within the engine. Conveniently, in a typical aircraft engine application of the invention, the portion of cooling air that is redirected is particularly desirable to cool various engine components during high throttle conditions at low altitudes and high ambient temperatures, which corresponds with engine operation when maximum cooling air is not required for clearance control at the turbine case 16.

The flow of cooling airflow into the bypass line 30 is controlled by a bypass line valve 32. When maximum cooling air is required at the turbine case 16, the bypass line valve 32 is closed and no air is diverted through the bypass line 30. The case cooling line 14 and the remainder of the air supply system are sized to ensure an effective volume of airflow at sufficient pressure to enter the case cooling tubes 18 of the clearance control 15 during its maximum volume flow condition. The cooling rate to the turbine case 16 is reduced to a nominal value by opening the bypass line valve 32 and allowing a portion of the cooling air to flow through the bypass line 30. The bypass line valve 32 is controlled with compressed air from a compressor section of the engine through a compressor air line 34. In the embodiment shown in FIG. 1, flow through the compressor air line 34 is controlled by an engine speed responsive control valve 36 in series with a barometric control valve 38. The barometric control valve 38 is an aneroid device that changes its position as a function of barometric pressure through coupling to barometer 37. The barometric control valve 38 completely opens at a prescribed altitude, thereby making it possible for compressed air to pass through high pressure line 34 when valve 38 is open and to actuate the bypass line valve 32 to a closed position. Closing valve 32 causes all of the cooling air flowing through the case cooling line 14 to continue past the bypass line 30 into the clearance control 15 to cool the turbine case 16 during high altitude aircraft cruise operation.

While the barometric control valve 38 is responsive to altitude, the engine speed control valve 36 is provided for the purpose of varying the position of bypass line valve 32 in response to an engine parameter. To provide this function in one embodiment of the invention, the engine speed control valve 36 is mechanically linked to an actuation arm 39 on a variable stator vane control on the engine compressor. Engine stator vane position is varied as a function of engine speed by independent mechanisms which do not form a part of this invention, and these mechanisms cause the actuation arm 39 to vary its position relative to the engine directly in response to engine speed. The actuation arm 39 is linked to the engine speed control valve 36 to mechanically cause the opening of valve 36.

Other means of actuating valve 36 can be utilized such as pressure or temperature signals from the engine which are appropriately related to engine speed. When valve 36 is open at moderate or high engine speed, the barometrically controlled valve 38 becomes the sole control on the bypass valve 32 allowing it to function as described above. Conversely, at lower engine speeds, valve 36 closes, eliminating any effect of valve 38 and shutting off the flow of compressor air through high pressure air line 34 when the engine is throttled down or at idle. Valve 36 thereby causes bypass line valve 32 to return to its open rest position and to divert cooling airflow from case cooling line 14. Thus, at low engine speed, when engine component efficiencies are less important, cooling air can be diverted from the clearance control by the barometric valve allowing the clearance to increase and avoiding rubs between the turbine blades and turbine shroud.

In another form of this embodiment, valve 32 is a variable position valve, and the size of its opening is controlled by the engine speed control valve 36. Normally, the size of the opening of the valve 32 would be inversely proportional to engine speed permitting greater flow to the clearance control 15 as the engine speed increases.

An additional feature provided as an option to the system, is represented in FIG. 1 by a valve 42 in a branch of the high pressure air line 34. This valve 42 is connected to a fire extinguishing agent supply line 43 to effect an automatic closing of the bypass line valve 32 in the event of a fire emergency while the extinguishing agent is being injected into the engine compartment. Valve 42 is a one-way valve that allows pressure from the extinguishing agent to automatically close valve 32 while preventing operations within the valve 32 from affecting the extinguishing system. The shut off of air through the bypass line 30 during a fire eliminates this potential source of oxygen to the region of combustion.

Alternate Embodiment

Figure 3:
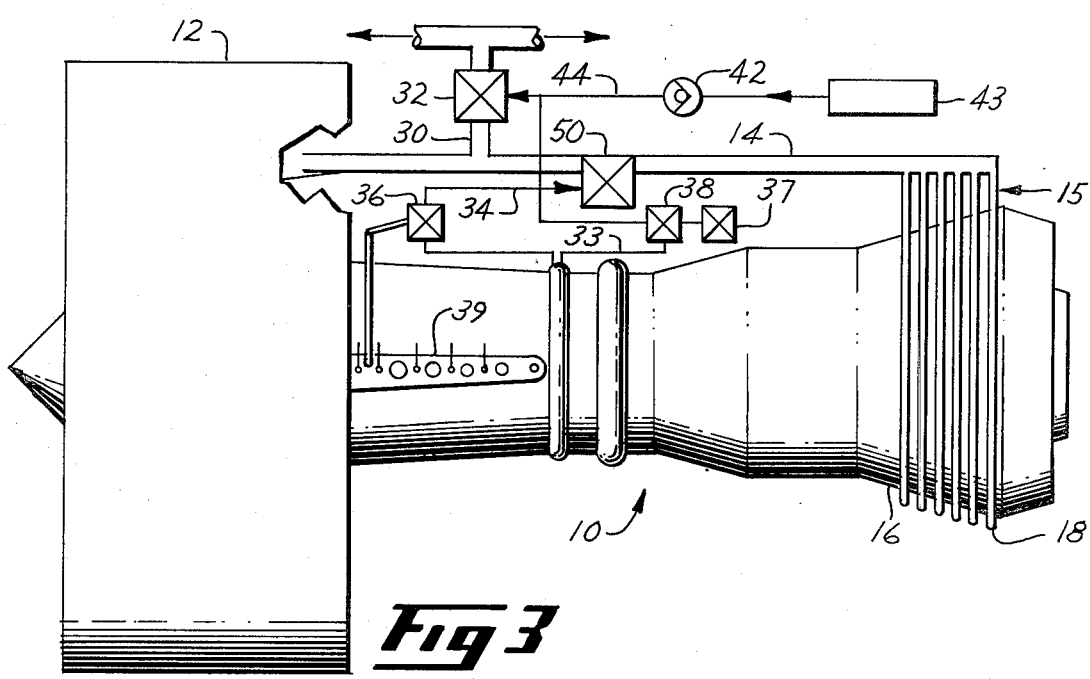
FIG. 3 is a schematic view of an alternate embodiment of the present invention employed on a gas turbofan aircraft engine.

Referring now to FIG. 3, an alternate embodiment of the present invention is shown wherein the means for controlling the flow of cooling air to the clearance control have been altered from the embodiment shown in FIG. 1. The major variation in the embodiment shown in FIG. 3 is the inclusion of a case cooling line valve 50 into the case cooling line 14 at a position between the bypass line 30 and the clearance control 15. This case cooling line valve 50 is provided for the purpose of either stopping the airflow through case cooling line 14 or reducing it to a very low value during periods of very low or idle engine speed. As described earlier, a very low priority is placed on engine performance during engine idle, and it is far more desirable to prevent the blades 20 from rubbing on the turbine shroud 22 during engine accel from low speed, than to improve engine performance at that operating condition.

In a variation of this embodiment, the case cooling line valve 50 can be a variable opening valve and can be employed for purpose of directly controlling cooling airflow through the case cooling line 14 to the clearance control 15. This form of the invention would be especially desirable when clearance is to be controlled solely as a factor of engine speed without any consideration for engine altitude.

In the operation of the apparatus shown in FIG. 3, maximum airflow is provided to the clearance control 15 by closing the bypass line valve 32 and opening the case cooling line valve 50. An intermediate or moderate flow rate through the case cooling line 14 is attained by opening both the case cooling line valve 50 and the bypass line valve 32. Opening valve 32 causes a portion of the cooling airflow through the case cooling line 14 to be diverted through the bypass line 30. This diverted cooling airflow is then directed, as described in reference to FIG. 1, to other airspace regions within the engine compartment that can benefit from cooling airflow. In this intermediate range of flow through the case cooling line 14, additional modulation of the airflow is available by adjusting the opening in the line valve 50, thereby causing varying amounts of cooling airflow to pass through the valve into the clearance control 15. Finally, extremely low or no-flow conditions through the case cooling line 14 are attained by closing the main pipe valve 50.

In the operation of the apparatus shown in FIG. 3 on an aircraft engine the cooling air is supplied through the case cooling line 14 to the clearance control 15 at a maximum rate during upper altitude operation of the aircraft including normal cruising conditions. This mode of operation would correspond to high throttle, steady-state operation of land or sea-based powerplants wherein the cooling air would also be supplied to the clearance control at maximum rate. The cooling airflow is supplied at an intermediate or nominal rate during low altitude operation of an aircraft powerplant or, correspondingly, during reduced power operation of land or sea-based powerplants. Finally, the cooling airflow is supplied to the clearance control at a very low rate or at shut-off during idle speed engine operation and additionally, during the start of transition to full throttle operation when major thermal transients are most likely to cause rubbing contact of the turbine blades with the surrounding shroud. These three primary modes of operation of the clearance control allow the engine to operate with relatively low blade tip clearance over a full range of engine speeds without creating conditions that would cause rubbing contact of the blades with the surrounding structure.

As stated earlier, to provide maximum cooling of the turbine case 16, the case cooling line valve 50 is opened and the bypass line valve 32 is closed. The case cooling line valve 50 is controlled by the engine speed control valve 36. The engine speed control valve 36 obtains speed-responsive actuation from the engine, such as described earlier in reference to FIG. 1, with a mechanical link to the actuation arm 39. When the engine speed is moderate or high, the engine speed control valve 36 causes the case cooling line valve 50 to be opened from its normally closed rest position, thereby allowing cooling air to flow to the clearance control 15 causing the clearance control to decrease clearance during high engine power settings, including aircraft cruise operation. Correspondingly, the bypass line valve 32 is closed during aircraft cruise operation to interrupt or greatly restrict diversion of cooling air from its path to the clearance control 15. The bypass valve 32 is operated by the barometric control valve 38 which functions to close the bypass valve 32 whenever the aircraft exceeds a prescribed altitude. In its rest position, the bypass valve 32 is open. The barometric control valve 38 closes the valve 32 by permitting a flow of compressed air to flow through compressor air line 33 to the valve whenever the barometric pressure, as sensed by the barometer 37, indicates that the aircraft is above the predetermined altitude.

While the present invention is constructed to supply a maximum volume of cooling air to the clearance control during cruise operation, it is desirable to moderate or diminish the flow to an intermediate value during certain periods of engine operation, such as low altitude operation or during reduced power operation. A moderate flow is achieved by opening the bypass line valve 32. In the application of the invention in an aircraft engine as shown in FIG. 3, moderation of the airflow is partially provided by the barometric control valve 38 which allows the bypass valve 32 to remain open in its rest position when the aircraft is below the predetermined altitude. When the bypass valve 32 is open, a substantial portion of the cooling airflow through the case cooling line 14 is diverted through the bypass line 30 to cool engine compartment equipment, particularly at low altitudes when the surrounding ambient air is at relatively high temperatures. As noted earlier, further moderation of the airflow is available by varying the opening of the case cooling line valve 50 in response to variations in engine speed.

The third mode of operation is desirable when the engine is running at a very low or idle speed. In this mode, the case cooling line valve 50 is closed by the engine speed control valve 36, thereby allowing very little or no flow of cooling air to the clearance control 15. The position of the bypass line valve 32 is dependent upon altitude and will be open when the aircraft is on the ground during normal idle conditions, allowing the excess of airflow to be directed through the bypass line 30 to other engine areas.

Regardless of the mode of engine operation, provision has been incorporated into the subject invention for throttle burst when the engine is rapidly gaining rotational engine speed and major thermal transients are occurring in the turbine section of the engine. Under these conditions, the turbine blades 20, shown in FIG. 2, are rotating at a high speed causing elastic deformation of the rotors. In addition, the turbine gases quickly attain high temperatures causing the turbine blades to expand more rapidly than the turbine shroud 22 because of the greater mass of the shroud in comparison to the blades, and because the blades are more directly exposed to the hot gases. Due to these conditions inside the turbine, it is desirable to delay the impingement of cooling air on the turbine case 16 until a period of time after the throttle burst has begun when the temperature of the turbine case and the surrounding turbine shroud 22 has increased causing thermal expansion of the shroud. This delay is provided by the case cooling line valve 50 and the high pressure air line 34 which are constructed such that the valve 50 does not open immediately, but progressively opens on a time-delayed basis. In one embodiment of the present invention, valve 50 is not fully open until a brief period, such as a few seconds, after the valve actuation signal begins. Thus, when throttle burst occurs and the actuation arm 39 moves to open the engine speed control valve 36, the case cooling line valve 50 is not fully open until a brief period after throttle burst has begun, thereby minimizing the potential of a rub between the blades 20 and the shroud 22.

Provision has also been made in the embodiment shown in FIG. 3, as in the embodiment shown in FIG. 1, for fire inside the engine compartment. When a fire occurs, it is desirable to eliminate the flow of air through the bypass line 30, just as in the embodiment shown in FIG. 1, because the oxygen in the cooling air would assist combustion and the cooling air would dilute fire agents being introduced to extinguish the fire inside the compartment. A check valve 42 that is actuated by pressure in the fire agent line is incorporated into a line 44 that enters into line 33 between the barometric control valve 38 and the bypass valve 32.

The invention is not limited to the particular embodiment shown and described herein, because various changes and modifications may be made without departing from the spirit or scope of the novel concept as defined by the following claims.

Having described the invention, what is claimed as novel and desired to be secured by Letters Patent of the United States is:

1. In a gas turbine engine having an engine case and a rotating machinery section rotatably supported therein, seal means circumferentially surrounding the rotating machinery section and attached to said engine case, and a clearance control comprising means for directing cooling air on said engine case for cooling thereof, thereby controlling clearance between said rotating machinery and said seal means, an improvement comprising:

cooling air control means for varying the amount of cooling air directed on said engine case, said cooling air control means comprising a bypass line in flow communication with a case cooling line for directing a portion of said cooling air from said case cooling line for the purpose of varying the amount of air provided to said clearance control, said bypass line being provided with a bypass line valve that is opened during appropriate engine operations to allow cooling airflow to enter said bypass line, said bypass line valve being controlled by fluid pressure;

a pressurized fire extinguishing source incorporated into said engine; and a pressure line connecting said pressurized fire extinguishing source to said bypass line valve for the purpose of closing said bypass line during release of fire extinguishing material.

2. The apparatus recited in claim 1, and further comprising:

a case cooling line valve provided in said case cooling line, downstream of said bypass line, for the purpose of directly controlling cooling airflow through said case cooling line.

3. The apparatus recited in claim 2, wherein said case cooling line valve is responsive to engine speed for the purpose of essentially eliminating cooling airflow to said clearance control below a predetermined engine speed.

4. The apparatus recited in claim 3 and further comprising:
an air line that supplies compressed air to said case cooling line valve for the purpose of controlling the opening of the case cooling line valve; and
an engine speed responsive control valve that is controlled by an engine speed responsive apparatus for turning on and off the compressed air in said air line thereby controlling the opening and closing of said case cooling line valve.

5. The apparatus recited in claim 4 wherein said engine speed responsive control valve is linked to a mechanical variable stator actuation system on a compressor section of the engine and wherein said variable stator actuation system changes condition in response to engine speed, thereby controlling opening and closing of said engine speed responsive valve.

6. The apparatus recited in claims 1, 2, or 5 wherein said bypass line valve is responsive to barometric pressure for the purpose of closing said bypass line valve below a predeter

* * * * *

UNITED STATES PATENT AND TRADEMARK OFFICE
CERTIFICATE OF CORRECTION

PATENT NO. : 4,304,093
DATED : December 8, 1981
INVENTOR(S) : Wallace M. Schulze It is certified that error appears in the above—identified patent and that said Letters Patent is hereby corrected as shown below:

Column 10, line 13, should read "below a predetermined barometric pressure."

Signed and Sealed this

Twenty-third Day of March 1982

[SEAL]

Attest:

GERALD J. MOSSINGHOFF

Attesting Officer — Commissioner of Patents and Trademarks